(12) United States Patent
Xie et al.

(10) Patent No.: US 9,214,297 B2
(45) Date of Patent: Dec. 15, 2015

(54) TOUCH PANEL AND A MANUFACTURING METHOD THEREOF

(71) Applicant: TPK Touch Solutions (Xiamen) Inc., Xiamen (CN)

(72) Inventors: Yanjun Xie, Wuhan (CN); Yau-Chen Jiang, Zhubei (TW); Bin Lai, Fuzhou (CN); Enshi Shi, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 12 days.

(21) Appl. No.: 13/865,152

(22) Filed: Apr. 17, 2013

(65) Prior Publication Data
US 2013/0270079 A1   Oct. 17, 2013

(30) Foreign Application Priority Data
Apr. 17, 2012  (CN) .......................... 2012 1 0113781

(51) Int. Cl.
| | | |
|---|---|---|
| *H01H 9/02* | (2006.01) | |
| *H01H 13/04* | (2006.01) | |
| *H01H 19/04* | (2006.01) | |
| *H01H 21/04* | (2006.01) | |
| *H01H 9/12* | (2006.01) | |
| *G06F 3/044* | (2006.01) | |

(52) U.S. Cl.
CPC . *H01H 9/12* (2013.01); *G06F 3/044* (2013.01)

(58) Field of Classification Search
CPC ....... H01H 1/00; H01H 13/70; H01H 13/702; H01H 13/703; H01H 13/704; H01H 2239/074; H01H 2203/008; H01H 2207/01; H01H 2221/00; H01H 2231/002; H01H 2231/012; H01H 2231/016; H01H 2231/052; H01H 2239/006
USPC .......................................... 200/305; 345/173
See application file for complete search history.

(56) References Cited

U.S. PATENT DOCUMENTS

| | | | | |
|---|---|---|---|---|
| 6,163,313 | A   * | 12/2000 | Aroyan et al. ................. | 345/173 |
| 2011/0128246 | A1* | 6/2011 | Esaka et al. .................... | 345/173 |
| 2012/0026122 | A1* | 2/2012 | Simmons ....................... | 345/174 |

FOREIGN PATENT DOCUMENTS

| | | |
|---|---|---|
| CN | 102200866 A | 9/2011 |
| JP | 2011170662 A | 9/2011 |

* cited by examiner

*Primary Examiner* — Edwin A. Leon
*Assistant Examiner* — Anthony R. Jimenez
(74) *Attorney, Agent, or Firm* — Gokalp Bayramoglu

(57) ABSTRACT

The present disclosure provides a touch panel which at least comprises a sensing area, a conductive wire area, and earthing lines. The conductive wire area surrounds the sensing area and is electrically connected to the sensing area, and the conductive wire area comprises a first conductive wire area and a second conductive wire area. The earthing lines are set between the first conductive wire area and the second conductive wire area. The touch panel can efficiently shield signal crosstalk between the first conductive wire area and the second conductive wire area by setting the earthing lines between the first conductive wire area and the second conductive wire area, thereby reducing the influence of signal crosstalk on efficiency of the touch panel.

21 Claims, 10 Drawing Sheets

TOUCH PANEL AND A MANUFACTURING METHOD THEREOF

This application claims the benefit of Chinese application No 201210113781.6, filed on Apr. 17, 2012.

BACKGROUND

1. Technical Field

The present disclosure relates to an input interface. More particularly, the present disclosure relates to a touch panel based input interface.

2. Description of the Related Art

In the present market of various consumer electronic products, touch panels are being widely used in portable electronic products such as PDAs, mobile phones, notebooks and tablet PCs to act as an interface for information communication. Moreover, since all the existing electronic products are designed with an Objective of being light thin, short and small is not enough space in a product for containing traditional input devices such as keyboard, mouse, etc., and especially, driven by the demand for humanized tablet PCs, touch panels have became a key component.

A conventional touch panel usually comprises a substrate, on which a sensing area and a conductive wire area surrounding the sensing area are disposed. First electrodes and second electrodes are distributed on the sensing area of the substrate according to one or more design patterns. First conductive wires and second conductive wires are distributed on the conductive wire area of the substrate and are electrically connected to the first electrodes and the second electrodes. First signals in the first electrodes and second signals in the second electrodes are transmitted to touch chips via first conductive wires and second conductive wires. According to Maxwell law, there exists magnetic field as long as there is an electrical current, and interference between magnetic fields is a source of single crosstalk. The first conductive wires and the second conductive wires within the conductive wire area are usually made of metal, and their spatial positions are extremely close and therefore, there exists a signal crosstalk between them. The signal crosstalk is also likely to emerge between the first conductive wires and the second electrodes and between the second conductive wires and the first electrodes. Signal crosstalk can cause loss and errors in data transmission, thereby affecting the normal use of the touch panel.

SUMMARY OF THE DISCLOSURE

In view of this, the present disclosure provides a touch panel, on a specific position of belt earthing lines are set to reduce the signal crosstalk of the touch panel and thereby improve signal stability of the touch panel.

The touch panel provided in the present disclosure at least comprises a sensing area, a conductive wire area, and earthing lines. The conductive wire area surrounds the sensing area and is electrically connected to the sensing area, wherein the conductive wire area comprises a first conductive wire area and a second conductive wire area. The earthily lines are set between the first conductive wire area and the second conductive wire area.

Based on the foregoing description, the touch panel provided in the present disclosure can effectively shield signal crosstalk in the first conductive wire area and the second conductive wire area by setting earthing lines between the first conductive wire area and the second conductive wire area such that influence of the signal crosstalk on the efficiency of the integral touch panel is reduced.

BRIEF DESCRIPTION OF THE DRAWINGS

For those skilled in the art, numerous embodiments and drawings described below are for illustration purpose only, and not to limit the scope of the present disclosure in any manner.

DETAILED DESCRIPTION OF THE EMBODIMENTS

For those skilled in the art to understand the present disclosure, numerous embodiments are described below, combined with drawings to minutely illustrate the matters of the disclosure and the purpose thereof.

Figure 1A:
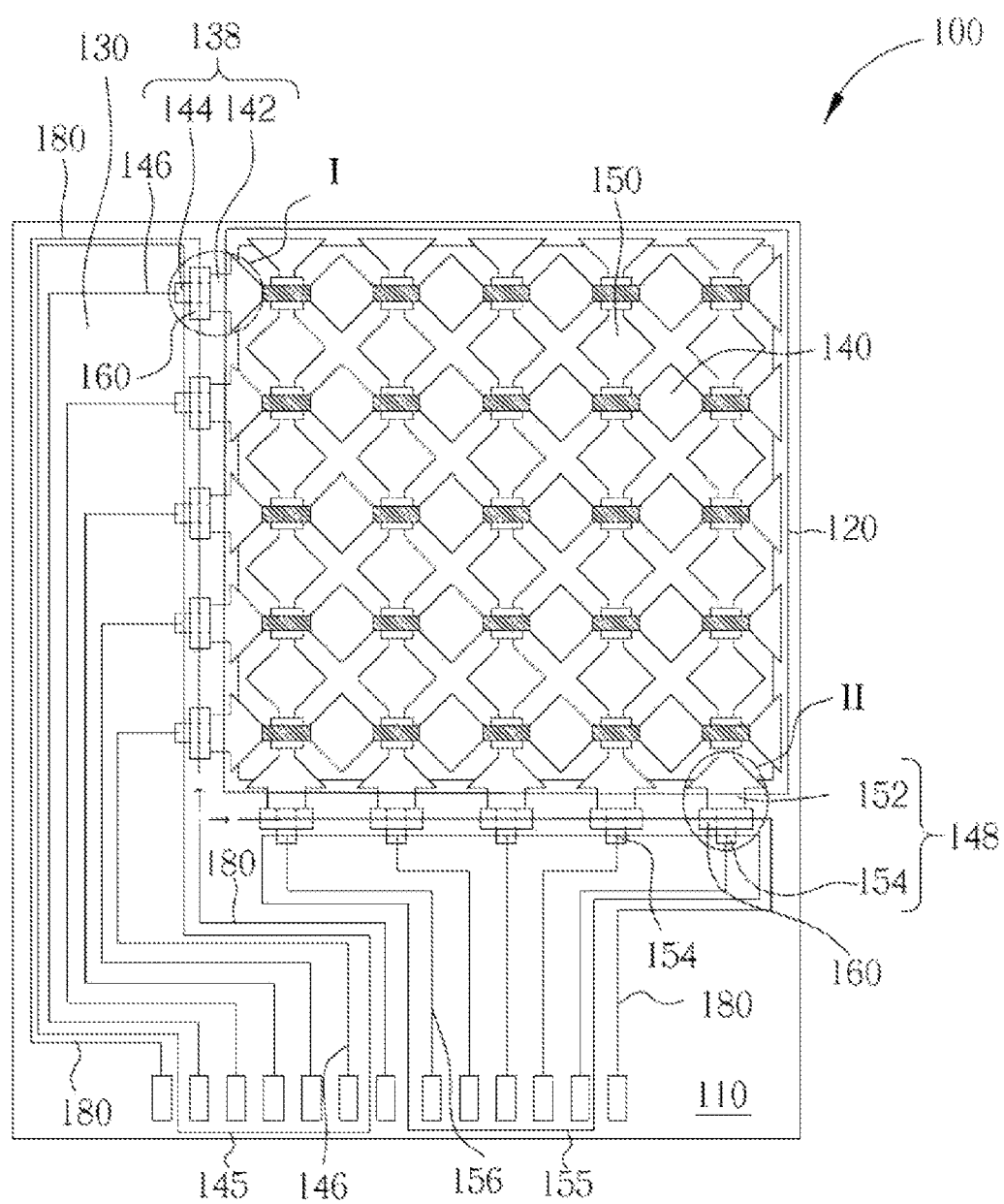
FIG. 1A is a schematic top view of a first preferred embodiment of the present disclosure.
Figure 1B:
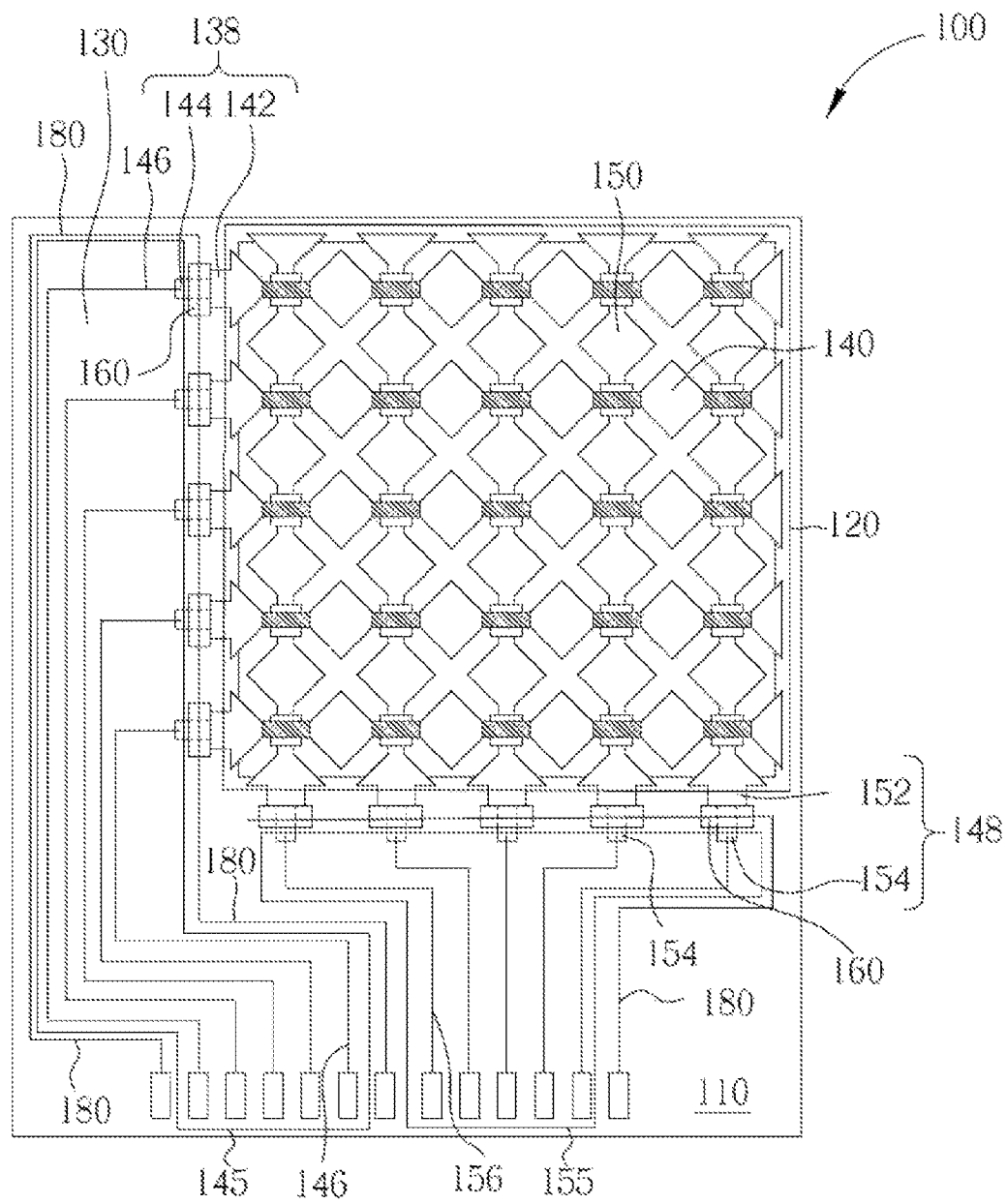
FIG. 1B is a schematic top view of another mode of the first preferred embodiment of the present disclosure.
Figure 1C:
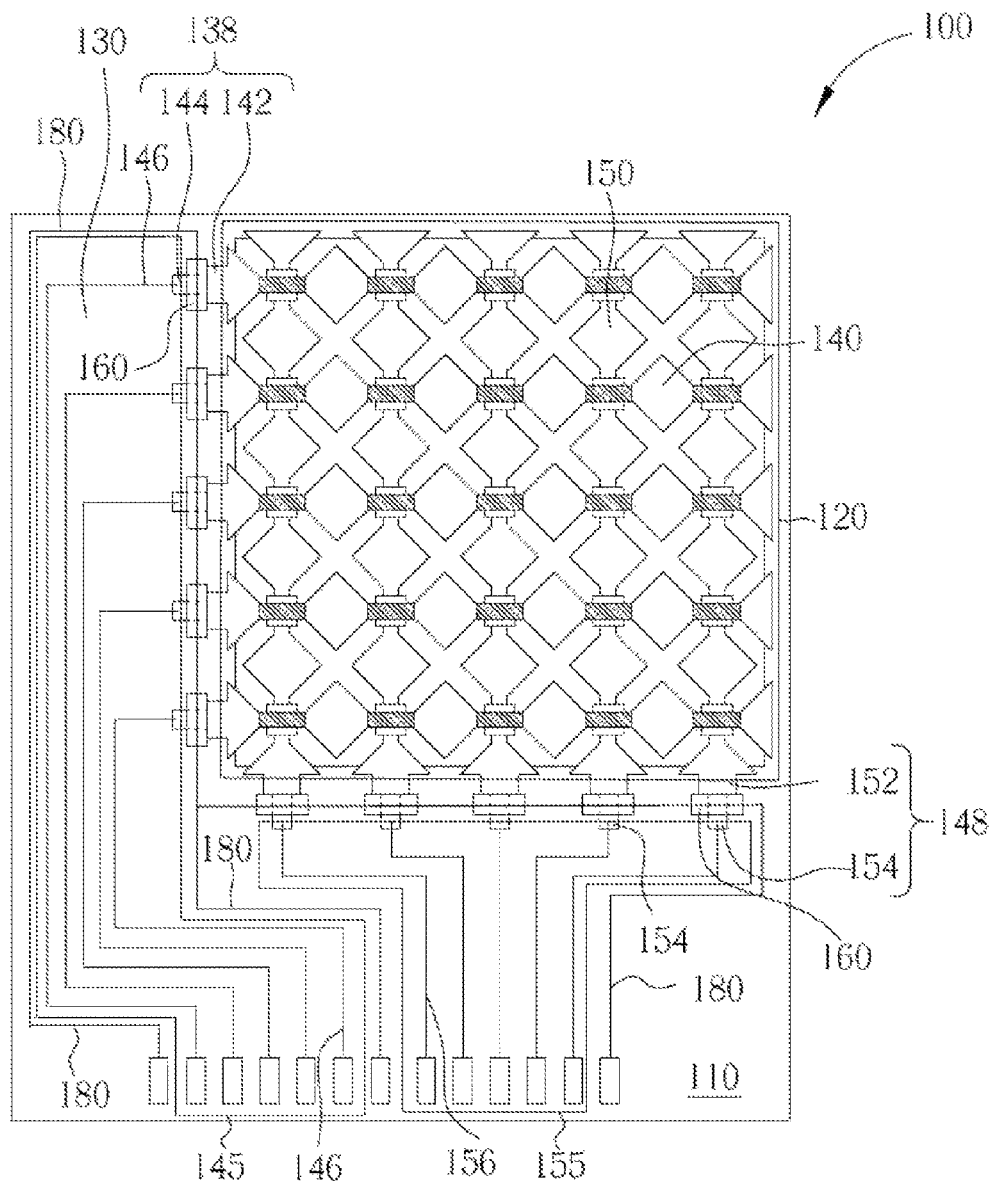
FIG. 1C is a schematic top view of another made of the first preferred embodiment of the present disclosure.

With reference to FIG. 1~FIG. 3, FIG. 1A is a schematic top view of a first preferred embodiment of the present disclosure, a idle FIG. 1B and FIG. 1C are schematic top views of other two modes of the first preferred embodiment of the present disclosure. FIG. 2A is a schematic enlarged view of part I of FIG. 1A and FIG. 2B is a schematic enlarged view of part II of FIG. 1A. FIG. 3A is a schematic sectional view of FIG. 2A along the line AA', and FIG. 3B is a schematic sectional view of FIG. 2B along the line AA'. In order to make it convenient for illustration and fix easier understanding of the present disclosure, drawings of the present embodiment are only schematic drawings, and their detailed proportions can be adjusted according to design requirements.

As shown in FIG. 1A a touch panel 100 provided in the present disclosure at least comprises a sensing area 120, a conductive wire area 130 surrounding the sensing area 120 and electrically connected to the sensing area 120, wherein the conductive wire area 130 comprises a first conductive wire area 145 and a second conductive wire area 155, and earthing lines 180 set between the first conductive wire area 145 and the second conductive wire area 155 with at least one end earthed, thereby being able to efficiently shield signal crosstalk between the first conductive wire area 145 and the second conductive wire area 155.

Generally speaking, the sensing area 120 and the conductive wire area 130 are formed on a substrate 110, wherein the sensing area 120 can be a visible area of the screen of the touch panel 100, while the conductive wire area 130 can be a non-transparent masking area. The sensing area 120 comprises a plurality of first electrodes 140 and a plurality of second electrodes 150, wherein the first electrodes 140 are arranged in parallel along a first direction, and the second electrodes 150 are arranged in parallel along a second direction, the first direction intersecting with the second direction, and wherein the first electrodes 140 and the second electrodes 150 are mutually insulated at the intersections. In this embodiment, the first direction is X axis and the second direction is Y axis the X axis being vertical to the Y axis, but it is not limited herein. The conductive wire area 130 comprises the first conductive wire area 145 and the second conductive wire area 155, wherein a plurality of first conductive wires 146 are set within the first conductive wire area 145 and are electrically connected to the first electrodes 140, and wherein a plurality of second conductive wires 156 are set within the second conductive wire area 155 and are electrically connected to the second electrodes 150. First connecting parts 138 and second connecting parts 148 are set within the conductive wire area 130 wherein electrical connection of the first electrodes 140 is achieved by the first connecting parts 138 and electrical connection of the second electrodes 150 is achieved by the second connecting parts 148.

As shown in FIG. 1A, FIG. 1B and FIG. 1C the earthing lines 180 can be extended from the area adjacent to the first conductive wire area 145 and the second conductive wire area 155 to the conductive wire area 130, and are electrically insulated from the conductive wire area 130. The extended earthing lines 180 can be located in the first conductive wire area 145 or the second conductive wire area 155. Specifically, the earthing lines 180 can be extended along the second direction or the first direction) to intersect with the first connecting parts 138 (or the second connecting parts 148), and are electrically insulated from the first connecting parts 138 (or the second connecting parts 148). The extension section of the earthing lines 180 can not only be electrically isolated from the earthing lines 180 distributed within the area adjacent to the first conductive wire area 145 and the second conductive wire area 155, but also be electrically connected with these earthing lines 180. At least one end of each earthing line 180 is earthed.

Figure 2A:
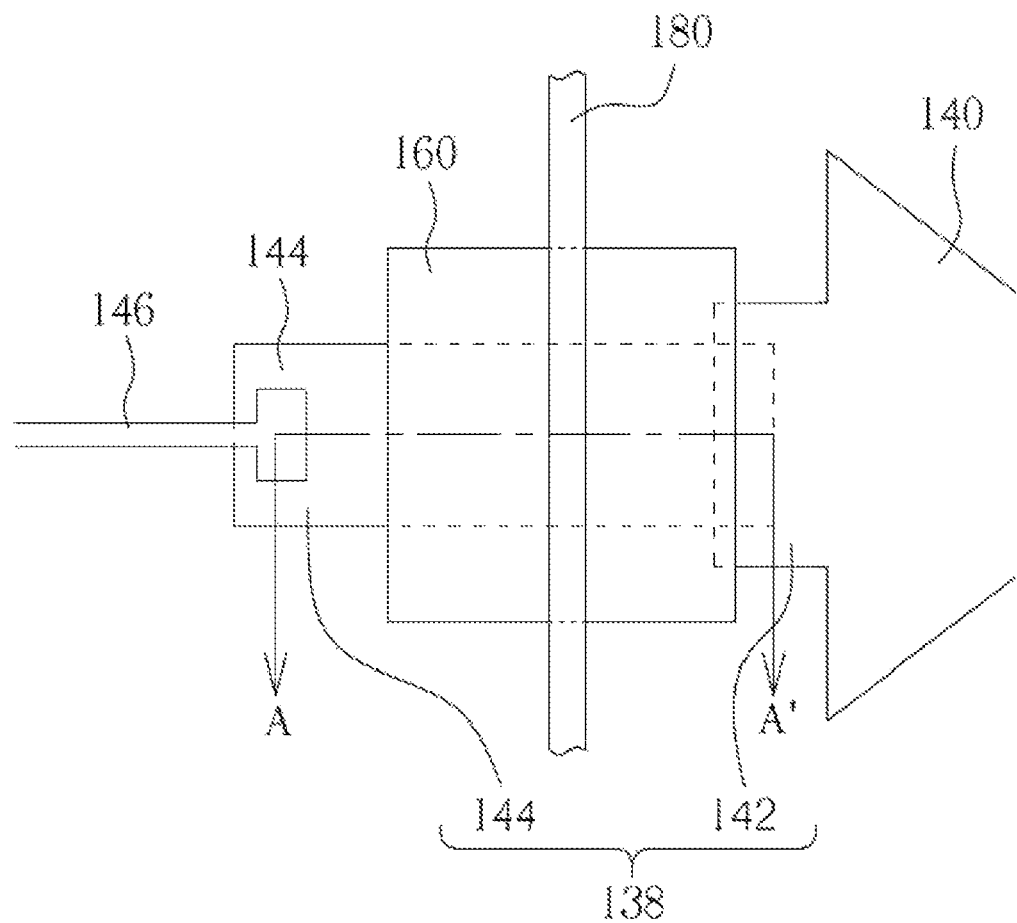
FIG. 2A is a schematic enlarged view of part I of the first preferred embodiment of the present disclosure.
Figure 2B:
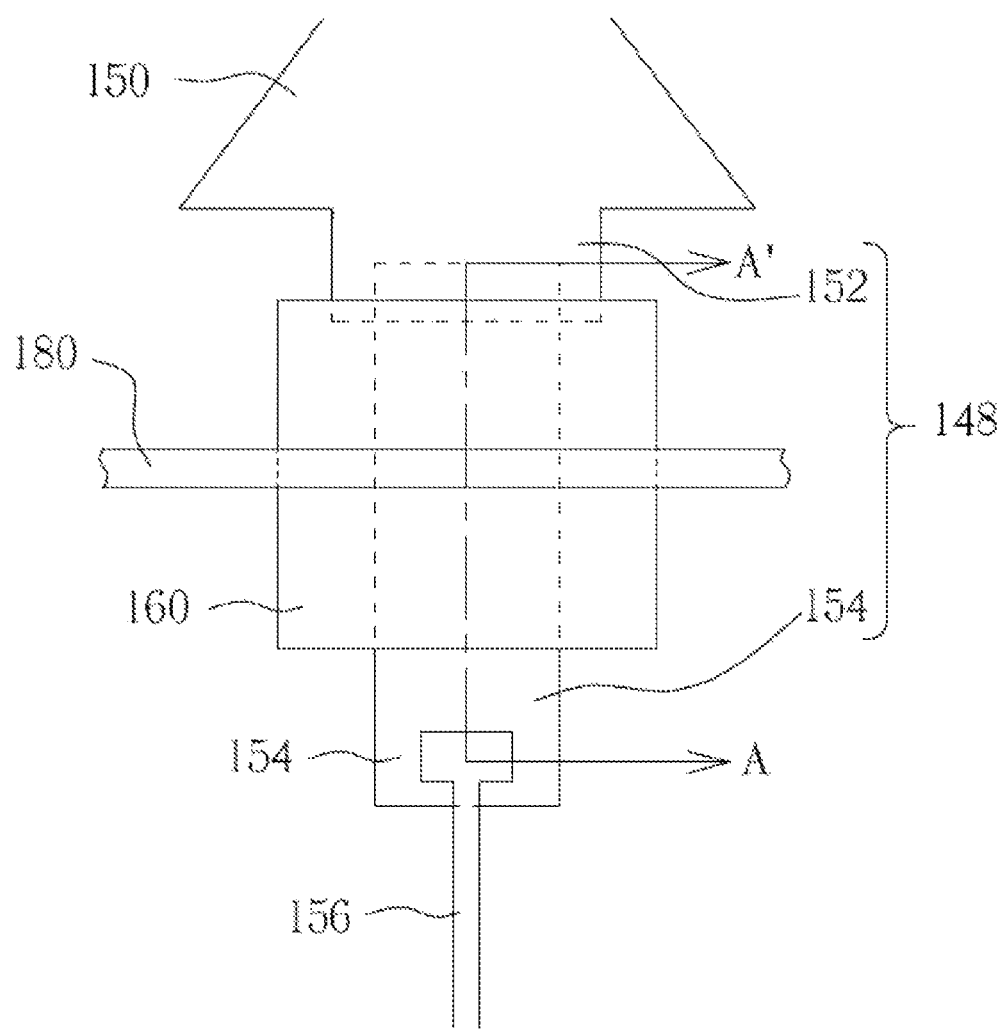
FIG. 2B is a schematic enlarged view of part II of the first preferred embodiment of the present disclosure.
Figure 3A:
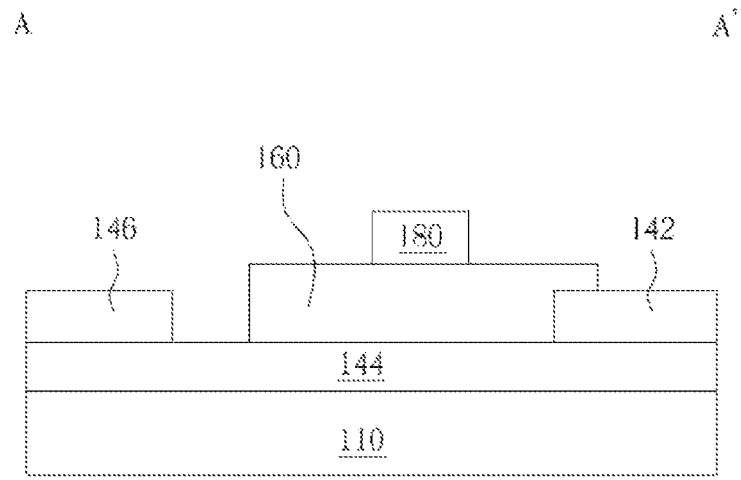
FIG. 3A is a schematic sectional view of the part I of the first preferred embodiment of the present disclosure along the line AA'.
Figure 3B:
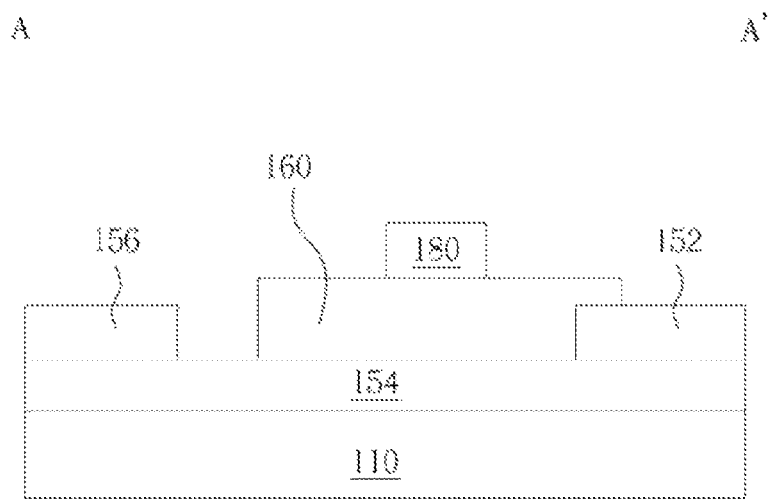
FIG. 3B is a schematic sectional view of the part II of the first preferred embodiment of the present disclosure along the line AA'.

As shown in FIG. 2A, the first connecting part 138 in the first preferred embodiment of the present disclosure comprises a first electrode extension part 142 and a first electrode bridging layer 144, wherein the first electrode bridging layer 144 is electrically connected to the first electrode extension part 142. As shown in FIG. 2B, the second connecting part 148 comprises a second electrode extension part 152 and a second electrode bridging layer 154, wherein the second electrode extension part 152 is electrically connected to the second electrode bridging layer 154. Insulating blocks 160 respectively cover the first connecting parts 138 and the second connecting parts 148. It is to be noted that the covering was of these insulating blocks 160 are the areas above the first connecting parts 138 and the second connecting parts 148, that is to say, these insulating blears 160 can cover the first electrode bridging layers 144 and the second electrode bridging layers 154 or cover the first electrode extension parts 142 and the second electrode extension parts 152. As a result, due to the insulating blocks 160, other conductive elements are not electrically connected with the first connecting parts 138 and the second connecting parts 148 to form electrical conduction while passing over theses connecting parts in the subsequent process. FIG. 3A and FIG. 3B are respectively sectional views of FIG. 2A and FIG. 2B along the section line A-A'. As shown in FIG. 3A and FIG. 3B, a plurality of first conductive wires 146 and a plurality of second conductive wires 156 are electrically connected to the first electrode bridging layers 144 and the second electrode bridging layers 154.

The earthing lines 180 are disposed on the insulating blocks 160 and intersect with the first connecting parts 138 and the second connecting parts 148. The extended earthing lines 180 can shield crosstalk between the first conductive wires 146 and the second electrodes 150, and can also shield crosstalk between the second conductive wires 156 and the first electrodes 140. The earthing lines 180 can further surround the first conductive wires 146 and the second conductive wires 156 to achieve a better shielding effect. It is to be noted that the earthing lines 180, the first conductive wires 146, and the second conductive wires 156 can be formed in a single step or in multiple steps. The earthing lines 180 are electrically isolated because of the insulating blocks 160 and are able to cross over the first electrodes 140 and the second electrodes 150, such that configuration of the earthing lines 180 is not subject to the configuration of other conductive wires and the earthing lines 180 can be located in a proper position according to the demand of manufacturing process.

The following text gives an illustration concerning different modes of touch panels of the present disclosure. To simplify the illustration, the following illustration mainly focuses on differences of various embodiments and does not repeat the identical points any more. Moreover, the same elements in the various embodiments of the present disclosure are marked with the same symbols to facilitate mutual contrast between various embodiments.

Figure 4:
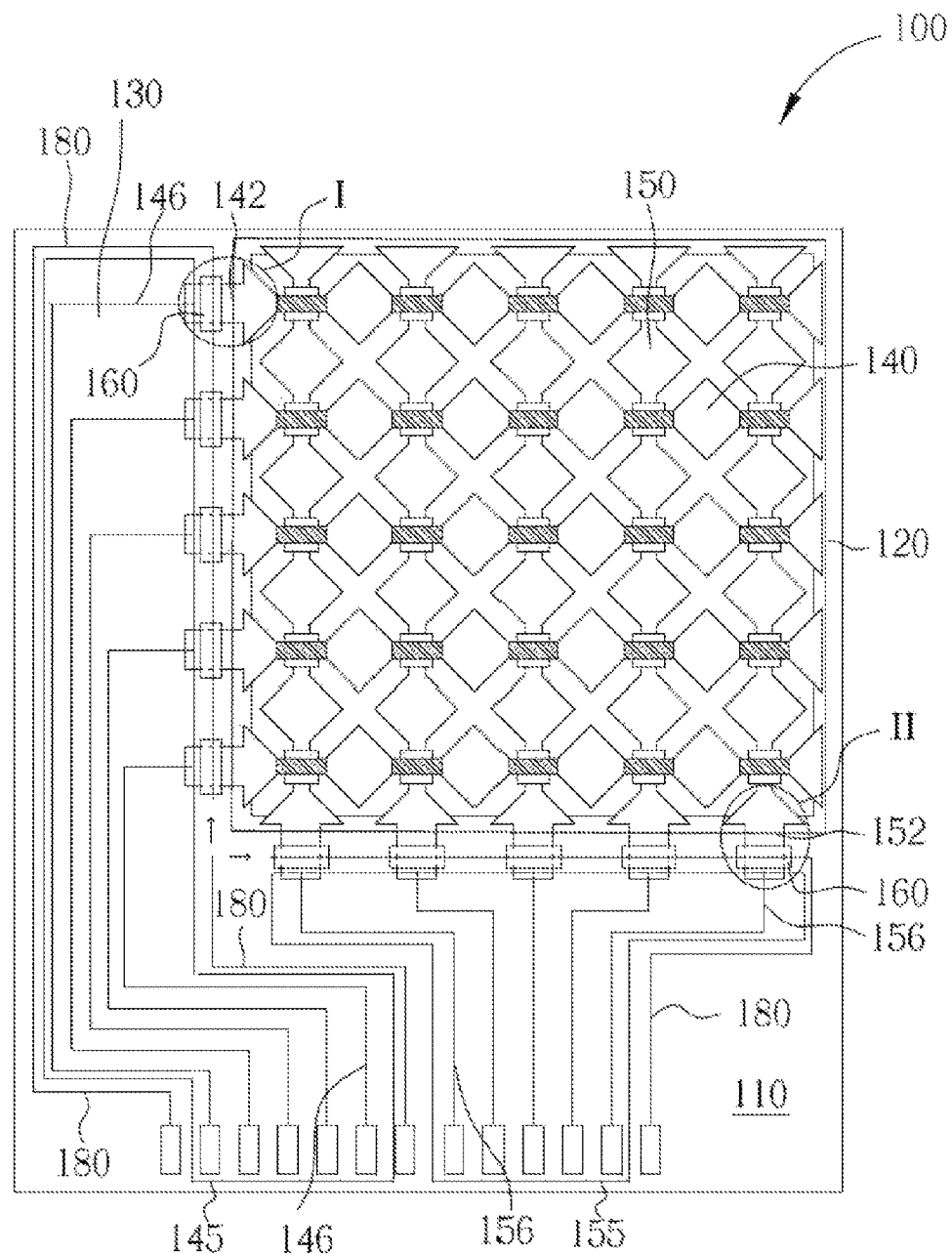
FIG. 4 is a schematic top view of a second preferred embodiment of the present disclosure.
Figure 5A:
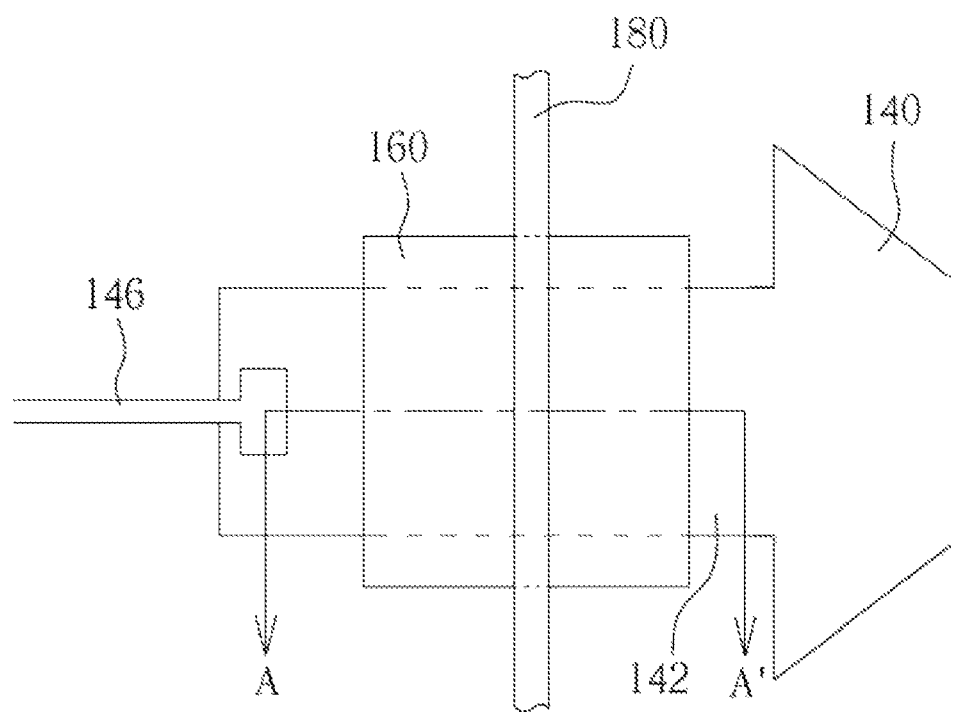
FIG. 5A is a schematic enlarged view of part I of the second preferred embodiment of the present disclosure.
Figure 5B:
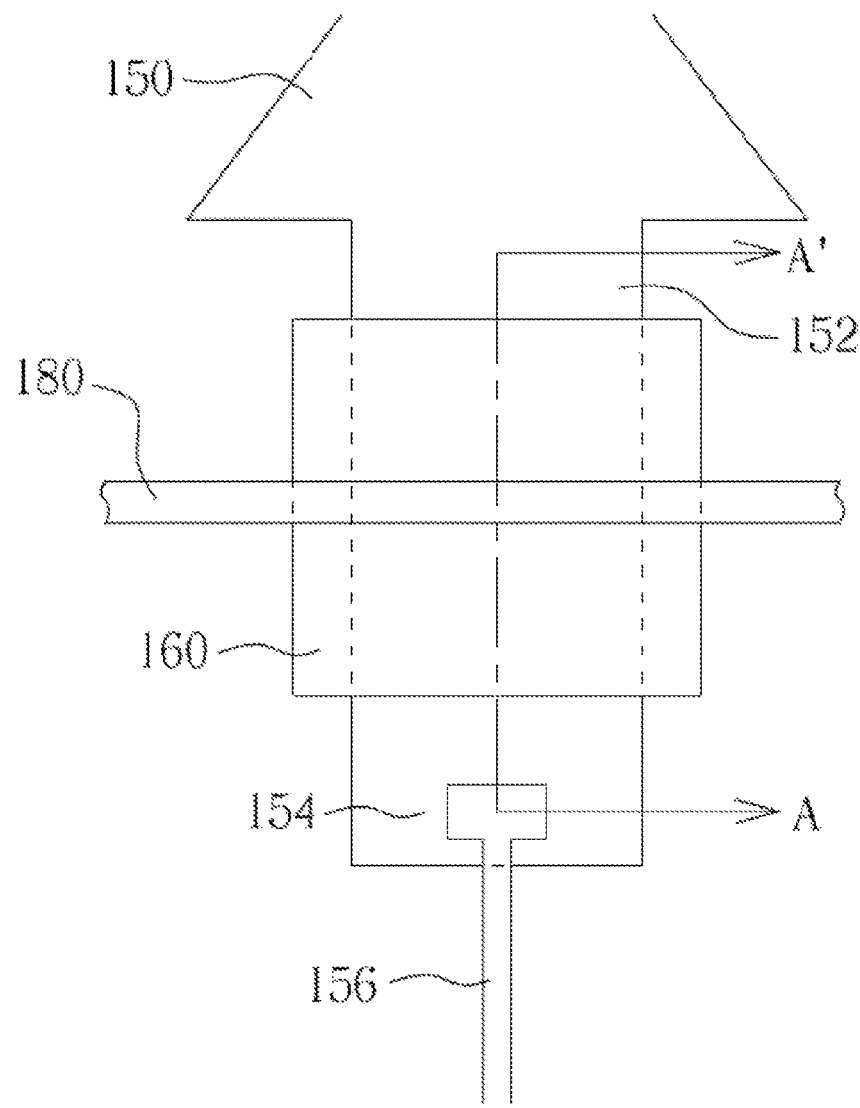
FIG. 5B is a schematic enlarged view of part II of the second preferred embodiment of the present disclosure.
Figure 6A:
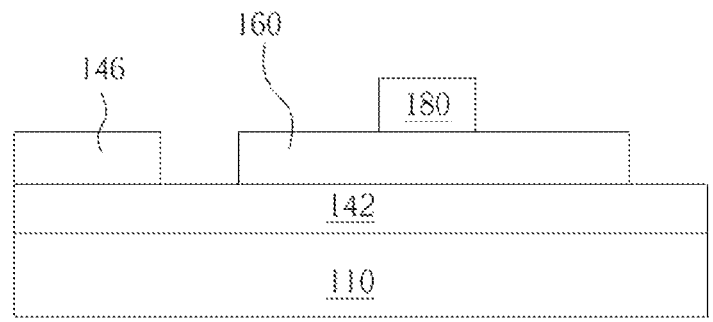
FIG. 6A is a schematic sectional view of the part I of the second preferred embodiment of the present disclosure along the line AA'.
Figure 6B:
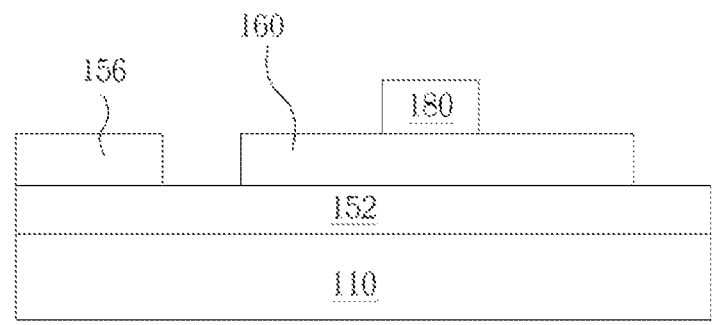
FIG. 6B is a schematic sectional view of the part II of the second preferred embodiment of the present disclosure along the line AA'.

With reference to FIG. 4~FIG. 6, FIG. 4 is a schematic top view of a second preferred embodiment of the preset disclosure; FIG. 5A is a schematic enlarged view of part I of FIG. 4; FIG. 5B is a schematic enlarged view of part II of FIG. 4; FIGS. 6A and 6B are respectively schematic sectional views of FIG. 5A and FIG. 5B along the line AA'. As shown in FIG. 4, the distinction between the second preferred embodiment and the first preferred embodiment of the present disclosure is that the second embodiment has no first electrode bridging layers 144 or second electrode bridging layers 154. It means that first conductive wires 146 and second conductive wires 156 are not electrically connected to the first electrode bridging layers 144 or to the second electrode bridging layers 154 anymore, but are instead electrically connected to first electrode extension parts 142 and second electrode extension parts 152 directly that is, first connecting parts 138 of the present embodiment only consist of the first electrode extension parts 142, and second connecting parts 148 only consist of the second electrode extension parts 152. Other structures are similar to those of the first preferred embodiment of the present disclosure, and enlarged views of the conductive extension parts are shown in FIG. 5A and FIG. 5B. The first electrode extension parts 142 or the second electrode extension parts 157 are covered with the insulating blocks 160 to impede conduction between earthing lines 180 and the conductive extension parts. Next, the first conductive wires 146 and the second conductive wires 156 are disposed on the first electrode extension parts 142 and the second electrode extension parts 152, and the earthing lines 180 are set between a first conductive wire area 145 and a second conductive wire area 155. The earthing lines 180 are further extended and disposed on the insulating blocks 160 to intersect with the first connecting parts 138 and the second connecting parts 148. The earthing lines 180 can further surround the first conductive wires 146 and the second conductive wires 156 to achieve a better shielding effect.

Sectional views of FIG. 5A and FIG. 5B are respectively shown in FIG. 6A and FIG. 6B. The second preferred embodiment of the present disclosure has no transparent binding structures and its process is more simplified than that of the first preferred embodiment. The second embodiment can also achieve the effect of shielding signal crosstalk, thereby making the earthing lines 180 cross over the conductive layers and make the configuration more flexible.

Material of the first electrodes 140 and the second electrodes 150 in the embodiment of the present disclosure can include various kinds of transparent conductive materials such as, but not limited to ITO, IZO, CTO, AZO, ITZO, zinc oxide, cadmium oxide, HfO, InGaZnO, InGaZnMgO or InGaAlO. Material of the first electrode extension parts 142 and the second electrode extension parts 152 can include the foregoing transparent conductive materials. Material of the insulating blocks 160 can include insulating materials such as, but not limited to polyimide (PI). $SiO_2$, SiN, SiCN or SiC. Material of the earthing lines 180, the first conductive wires 146, and the second conductive wires 156 can be selected from metals such as aluminum, copper, and silver or the foregoing transparent conductive materials, but it is not limited herein.

In conclusion, the present disclosure provides a touch panel structure which can efficiently shield signal crosstalk between a first conductive wire area and a second conductive wire area by setting earthing lines between the first conductive wire area and the second conductive wire area thereby reducing the influence of the signal crosstalk on the efficiency of the integral touch panel. The intersections between the earthing lines and first electrodes and between the earthing lines and second electrodes are set with insulating blocks, thus enabling the earthing hues to cross over the first electrodes and the second electrodes and not to be subject to the configuration of wires on a substrate, and thereby achieving a better shielding effect and variable circuit configurations. Moreover, sensitivity of the product can be improved and area of the circuit board can be reduced.

While certain embodiments have been shown and described, various modifications and substitutions maybe made thereto without departing fpm the spirit and scope of the disclosure. Therefore, it is to be understood that the present disclosure has been described by way of illustration and not limitations.

What is claimed is:

1. A touch panel, comprising:
    a substrate comprising:
        a sensing area; and
        a conductive wire area, surrounding the sensing area and electrically connected to the sensing area, wherein the conductive wire area comprises a first conductive wire area and a second conductive wire area; and
    earthing lines, extended to the conductive wire area and electrically insulated from the conductive wire area, wherein the earthing lines are set between the first conductive wire area and the second conductive wire area and surround the first conductive wire area, the earthing lines comprising:
    a first earthing line, set between the first conductive wire area and the second conductive wire area; and
    a second earthing line, set between the sensing area and the first conductive wire area and extended along an area between the first conductive wire area and edges of the substrate, so as to allow the first and second earthing lines to surround the first conductive wire area.

2. The touch panel of claim 1, wherein the earthing lines are extended to the second conductive wire area, the earthing lines further comprising
    a third earthing line, set between the sensing area and the second conductive wire area and extended along an area between the second conductive wire area and edges of the substrate, so as to allow the first and third earthing line to surround the second conductive wire area.

3. The touch panel of claim 1, wherein the sensing area comprises:
    a plurality of first electrodes, arranged along a first direction; and
    a plurality of second electrodes, arranged along a second direction and electrically insulated from the plurality of first electrodes.

4. The touch panel of claim 3, wherein the conductive wire area comprises:
    a plurality of first conductive wires distributed on the first conductive wire area and electrically connected to the plurality of first electrodes; and a
    plurality of second conductive wires distributed on the second conductive wire area and electrically connected to the plurality of second electrodes.

5. The touch panel of claim 4, wherein the conductive wire area further comprises:
    first connecting parts, wherein the first conductive wires are electrically connected to the first electrodes through the first connecting parts, and wherein the earthing lines are extended to intersect with the first connecting parts and is electrically insulated from the first connecting parts.

6. The touch panel of claim 5, wherein the conductive wire area further comprises: second connecting parts, wherein the second conductive wires are electrically connected to the second electrodes though the second connecting parts, and wherein the earthing lines are extended to intersect with the second connecting parts and is electrically insulated from the second connecting parts.

7. The touch panel of claim 5, further comprising a plurality of insulating blocks set between the earthing lines and the first connecting parts.

8. The touch panel of claim 5, wherein the first connecting part comprises a first electrode extension part and a first electrode bridging layer.

9. The touch panel of claim 5, wherein the first connecting part comprises a first electrode bridging layer.

10. The touch panel of claim 5, wherein the earthing lines are located at the periphery of the plurality of first conductive wires and surround the plurality of first conductive wires.

11. The touch panel of claim 6, further comprising a plurality of insulating blocks set between the earthing lines and the second connecting parts.

12. The touch panel of claim 6, wherein the second connecting part comprises a second electrode extension part and a second electrode bridging layer.

13. The touch panel of claim 6, wherein the second connecting part comprises a second electrode bridging layer.

14. The touch panel of claim 6, wherein the earthing lines are located at the periphery of the plurality of second conductive wires and surrounds the plurality of second conductive wires.

15. The touch panel of claim 3, wherein the first direction intersects with the second direction.

16. The touch panel of claim 3, wherein materials of the first electrodes and the second electrodes comprise transparent conductive materials.

17. The touch panel of claim 4, wherein materials of the first conductive wires and the second conductive wires comprise metals or transparent conductive materials.

18. The touch panel of claim 1, wherein material of the earthing lines comprises metals or transparent conductive materials.

19. The touch panel of claim 1, wherein the earthing lines further comprise:
   an extension section, connecting the first earthing line and the second earthing line.

20. The touch panel of claim 2, wherein the earthing lines further comprise:
   an extension section, connecting the first earthing line and the third earthing line.

21. The touch panel of claim 2, wherein the earthing lines further comprise:
   an extension section, connecting the first earthing line, the second earthing line and the third earthing line.

\* \* \* \* \*